United States Patent
McConnell et al.

(10) Patent No.: US 8,922,199 B2
(45) Date of Patent: Dec. 30, 2014

(54) MAGNETIC SENSING DEVICE FOR FASTENERS

(75) Inventors: Reed Lackland McConnell, Austin, TX (US); Jamie Parker Lamb, Jr., Austin, TX (US); Gregory John Young, Lake Mary, FL (US)

(73) Assignee: Austin R&D, Inc., Austin, TX (US)

( * ) Notice: Subject to any disclaimer, the term of this patent is extended or adjusted under 35 U.S.C. 154(b) by 304 days.

(21) Appl. No.: 13/559,033

(22) Filed: Jul. 26, 2012

(65) Prior Publication Data
US 2014/0028296 A1    Jan. 30, 2014

(51) Int. Cl.
*G01B 7/14*   (2006.01)
(52) U.S. Cl.
USPC ............ 324/207.11; 324/207.13; 324/207.22; 324/207.24
(58) Field of Classification Search
CPC .......... G01B 7/02; G01B 7/026; G01B 7/023; G01B 7/06; G01B 7/00; G01B 7/046; G01B 7/14; G01R 33/02; G01R 33/022; G01R 33/028
See application file for complete search history.

(56) References Cited

U.S. PATENT DOCUMENTS

| 3,810,385 A * | 5/1974 | McFaul et al. .................. 73/629 |
| 2008/0131228 A1 * | 6/2008 | Sheets ............................ 411/14 |

* cited by examiner

*Primary Examiner* — Arleen M Vazquez
*Assistant Examiner* — Son Le
(74) *Attorney, Agent, or Firm* — Jackson Walker L.L.P.

(57) ABSTRACT

A method and system for magnetic measurement of elongation of a fastener includes a means for providing a magnetic field gradient along an axis of the fastener, such as one or more permanent magnets. A magnetic sensor is mounted in the fastener in the magnetic field gradient. Magnetic field measurements taken by the magnetic sensor are dependent on a length of the fastener and are sufficiently sensitive to monitor loading during a service life of the fastener. The fastener may be equipped with a signal reader and a data interface for offloading measurement values.

20 Claims, 5 Drawing Sheets

MAGNETIC SENSING DEVICE FOR FASTENERS

BACKGROUND

1. Field of the Disclosure

The present disclosure relates to magnetic measurement and, more particularly, to magnetic measurement in fasteners.

2. Description of the Related Art

The safety and reliability of fasteners, including threaded fasteners, is an important concern in many industrial areas, such as mining, chemical storage, pipelines, aerospace, and power generation, among others. One issue that affects service life of threaded fasteners and hence, the equipment they are installed in, is accurately determining loading and/or tightness at installation and during the service life. Vibrations and harsh environmental conditions during operation of the equipment in which they are installed can alter the effectiveness of installed fasteners. Even when a correct torque is applied to a large threaded fastener at installation, a desired service loading may not be attained and/or maintained during the service life of the fastener.

SUMMARY

Figure 1:
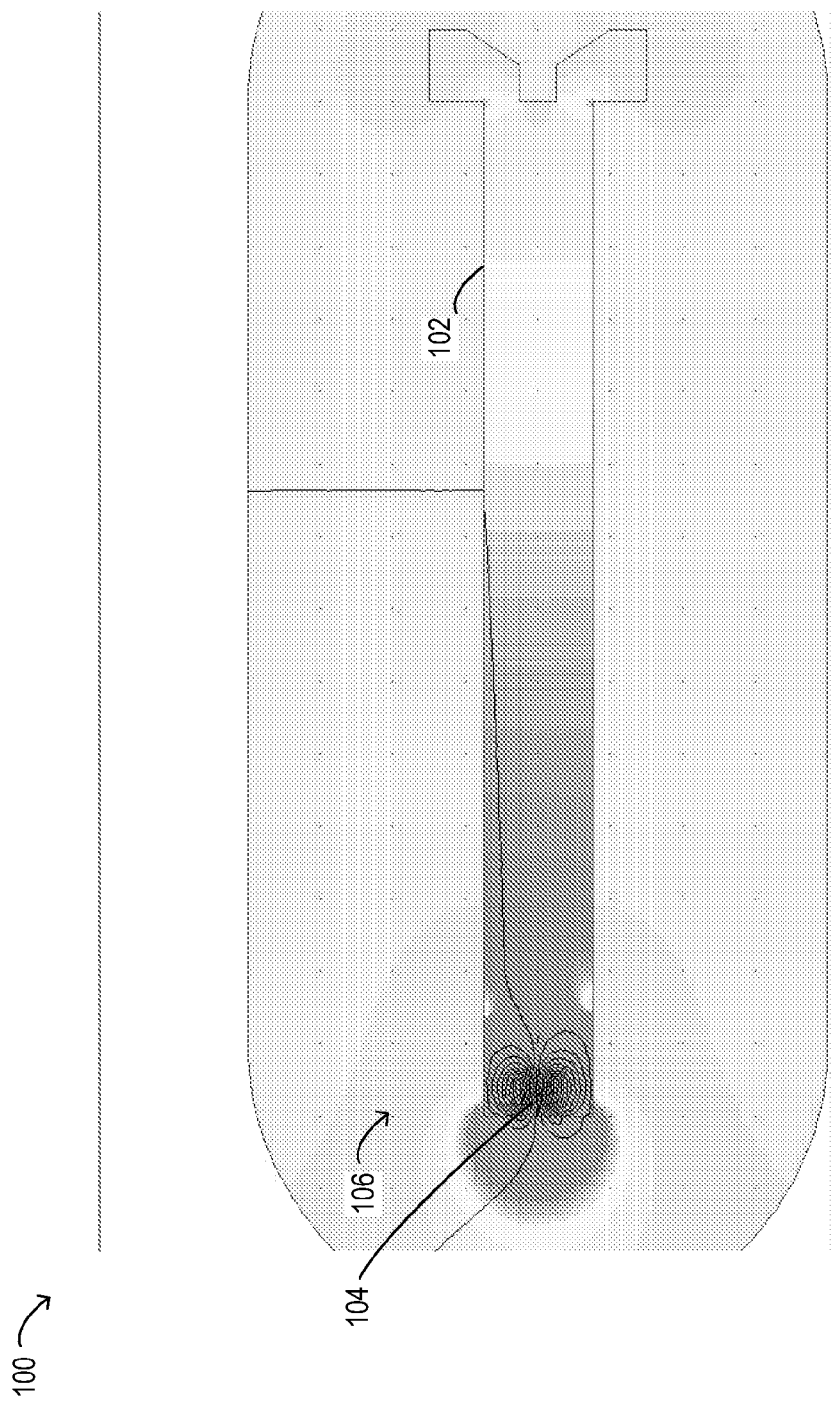
FIG. 1 is a block diagram of selected elements of an embodiment of analysis results of magnetic field strength.

Large threaded fasteners are used to secure heavy machinery in many types of industrial equipment. Proper operation of these fasteners over a service lifetime may determine economic performance of large capital assets. One difficulty with improving safety and reliability of large threaded fasteners has been monitoring the actual loading of the fastener in service. Embodiments of a novel threaded fastener, as described in further detail herein, may be used to continuously measure an operational condition of the fastener while in service.

In one aspect, a disclosed method for monitoring elongation of a fastener includes receiving an output signal from a magnetic sensor installed on the fastener. The output signal may be indicative of a magnetic field strength generated by a first magnet installed on the fastener at a first distance to the magnetic sensor. The method may also include registering a reference signal from the magnetic sensor when the first distance is a known value, and registering an elongation value for the fastener based on the output signal and the reference signal when the first distance changes from the known value.

In certain embodiments, the method includes storing the elongation value and/or transmitting the elongation value to an external device. The magnetic field strength may be generated between the first magnet and a second magnet installed on the fastener at a second distance to the magnetic sensor. Transmitting the elongation value may be performed with a wireless interface. The wireless interface may be a radio frequency identification (RFID) tag.

In another aspect, a fastener configured for monitoring elongation includes a processor configured to access memory media and a magnetic sensor. The memory media may include processor executable instructions to receive output data generated by the magnetic sensor indicative of a magnetic field strength along a central axis of the fastener, and calculate, based on a reference value for the magnetic field strength and the output data, an elongation of the fastener. The instructions may be executable to store data indicative of the elongation. The magnetic field strength may arise from at least one magnet installed in the fastener.

In particular embodiments, the magnetic field strength may arise from two magnets installed in the fastener, while the magnetic sensor may be located between the two magnets. The fastener may include a wireless interface, while the memory media may include processor executable instructions to transmit the data indicative of the axial elongation using the wireless interface. The wireless interface may be an RFID tag configured to store the data indicative of the elongation. The instructions may be executable to store the reference value in response to a user input and/or calibrate the magnetic field strength to the elongation. The fastener may be configured to detect a change in the elongation, including a change of about 0.008 millimeters.

In a further aspect, a disclosed sensor includes a first magnet installed at an end portion of a threaded fastener, and a second magnet installed at a given distance to the first magnet along a radial axis of the threaded fastener. The sensor may also include a magnetic sensor responsive to a magnetic field strength installed between the first magnet and the second magnet, and a signal reader configured to receive an output signal of the magnetic sensor and register changes in the magnetic field strength.

In given embodiments, the signal reader may include a processor, and memory media accessible to the processor and storing processor executable instructions to implement at least a portion of the signal reader. The changes in the magnetic field strength may represent elongation data for the threaded fastener based on a change in the given distance between the first magnet and the second magnet. The memory media may be configured to store measurement data derived from the output signal of the magnetic sensor and/or the elongation data. The sensor may also include an interface for transmitting the elongation data. The interface may be a wireless interface and may include an RFID tag.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Referring now to FIG. 1, a block diagram of selected elements of an embodiment of analysis results 100 of magnetic field strength is depicted. In FIG. 1, analysis results 100 depicts a result of a finite element analysis of bolt 102 (representing a large threaded fastener) having magnet 104 mounted at end portion 106. Specifically, a model of variation of magnetic field strength along an axis of bolt 102 for a given magnetic field provided by magnet 104 is illustrated in analysis results 100. The variation in magnetic field strength is shown by the shading in analysis results 100. Thus, in FIG. 1, a measurable gradient of magnetic field strength resulting from magnet 104 is evident. In certain embodiments, magnet 104 may be a high strength magnet, for example, a magnet made from a rare-earth element and/or an alloy thereof. This gradient of magnetic field strength reveals a highly sensitive dependency of magnetic field on a length of bolt 102. Conversely, when the length of bolt 102 changes while subject to a magnetic field from a constant source (i.e., magnet 104), a magnetic field strength at a particular position along bolt 102 also changes. In analysis results 100, the value of the magnetic field strength gradient indicates a resolution for elongation measurements of about 8 μm (about 0.0003 inches), which is suitable for a wide range of applications. This underlying property has been exploited in the magnetic sensing device described herein to provide accurate and reliable monitoring, as will now be explained in further detail.

Figure 2:
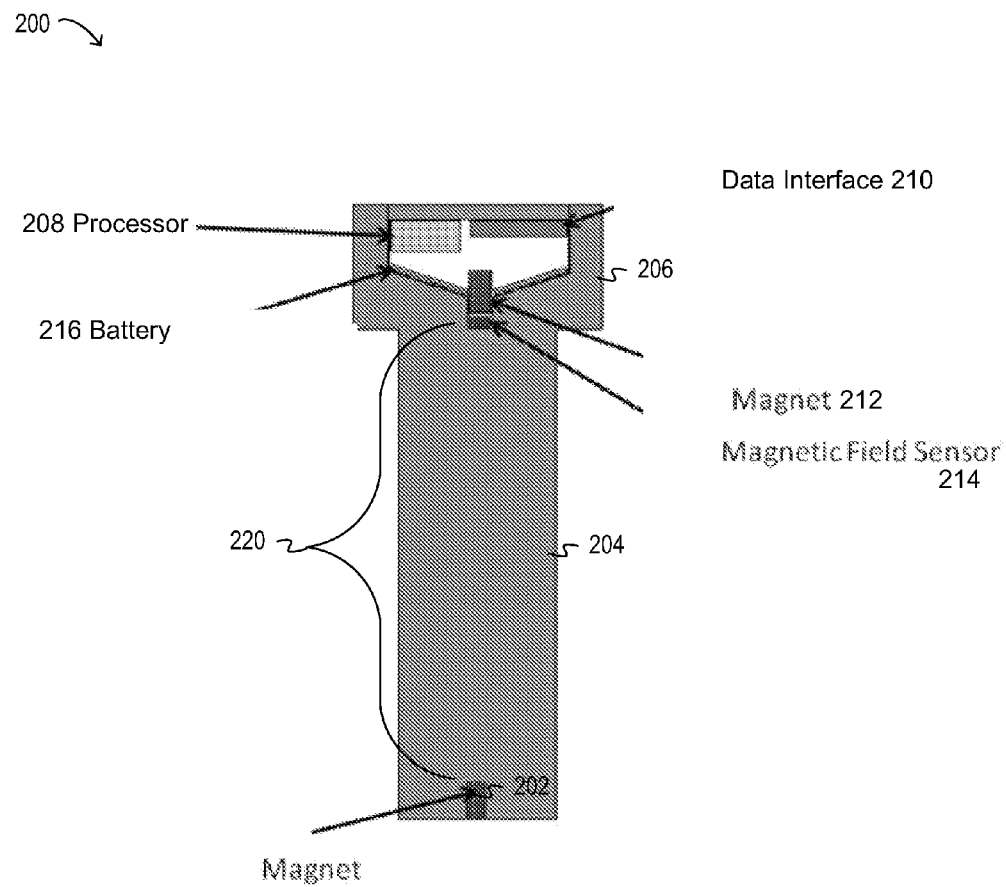
FIG. 2 is a block diagram of selected elements of an embodiment of a magnetic sensing device.

Turning now to FIG. 2, a block diagram of selected elements of an embodiment of magnetic sensing device 200 is illustrated. As shown in FIG. 2, magnetic sensing device 200 includes elements incorporated within physical dimensions of bolt 204, such that magnetic sensing device 200 may be fashioned as a direct replacement for a standard bolt (not shown). In certain embodiments, certain external connections and/or interfaces may be present between magnetic sensing device 200 and external devices (not shown). In other embodiments, magnetic sensing device 200 may be configured to operate in a self-contained implementation, absent any external physical connections and/or interfaces. It is noted that magnetic sensing device 200 may be formed by performing certain modifications on a standard bolt, which are designed to have a minimum impact on an intended and/or specified mechanical performance of bolt 204. For descriptive clarity, certain elements have been omitted from magnetic sensing device 200 (see also FIG. 4).

As shown in FIG. 2, magnetic sensing device 200 includes lower magnet 202 and upper magnet 212, which may be permanent magnets that provide for a magnetic field gradient along a longitudinal axis (not shown) of cylindrically-shaped bolt 204 (see also FIG. 1). It is noted that in certain embodiments, a single magnet may replace a combination of lower magnet 202 and upper magnet 212. Magnetic field sensor 214 may be centrally mounted in a cavity formed within bolt head 206 of bolt 204 and placed between lower magnet 202 and upper magnet 212, which may be mounted with aligned magnetic poles to increase the resulting magnetic field gradient. Specifically, magnetic field sensor 214 may be mounted at distance 220 from lower magnet 202 as well as a known distance from upper magnet 212, which may be a precisely known displacement and may correspond to a given elongation of bolt 204. Accordingly, magnetic field sensor 214 may be able to detect small changes in magnetic field strength, which may indicate a relative displacement of lower magnet 202 with respect to upper magnet 212, which, in turn, may result from a change in elongation of bolt 204 (represented by a change in distance 220). Thus, a change in magnetic field strength detected by magnet field sensor 214 may be used as an accurate representation of elongation of bolt 204.

Also shown in FIG. 2 are battery 216, processor 208, and data interface 210, which may facilitate operation of magnetic field sensor 214 and reporting of measurement results. Battery 216 may represent a power source and/or a power interface for processor 208, data interface 210, and/or magnetic field sensor 214. Processor 208 may handle operation of magnetic field sensor 214 and related calculations and may transfer measurement data to data interface 210. It is noted that processor 208 and/or data interface 210 may include memory media (not shown in FIG. 2, see FIG. 4) for storing instructions, data, or both. In certain embodiments, data interface 210 may be configured to receive instructions, data, or both, for example, for controlling operation of processor 208. In given embodiments, data interface 210 may include an RFID tag that may store data indicative of the elongation of the fastener. The RFID tag may then output a value when a corresponding RFID reader is brought within a vicinity of magnetic sensing device 200. Furthermore, in some embodiments, magnetic sensing device 200 may be responsive to user input, either at a control element (not shown) in bolt head 206 and/or via data interface 210. For example, responsive to user input, magnetic sensing device 200 may be configured to store and/or transmit one or more measurement values.

As shown in FIG. 2, battery 216, processor 208, and data interface 210, along with connecting elements (not shown) may be housed within an inner cavity of bolt head 206, which may enable bolt head 206 to be used to rotate bolt 204 without interfering with a corresponding tool, such as a wrench or a socket tool (not shown). In certain embodiments, data interface 210 may be a wireless interface that may enable communication using external wireless networks. In this manner, magnetic sensing device 200 may be configured to be continuously available for contact with monitoring equipment via wireless signals. Data interface 210 may accordingly be equipped with an antenna (not shown) to facilitate wireless communications. When external connections to magnetic sensing device 200 are desired (e.g., for communications or power sources), corresponding connectors and/or interfaces may be located at or near bolt 204 or bolt head 206.

In operation of magnetic sensing device 200, lower magnet 202 and upper magnet 212 may provide a permanent magnetic field along bolt 204. Magnetic field sensor 214 may be used to detect the magnetic field strength at a given position near bolt head 206. A baseline measurement of bolt 204 may be recorded using magnetic field sensor 214 prior to installation of bolt 204. Another reference measurement using magnetic field sensor 214 may be performed during installation and/or tightening, for example, to precisely set a desired installation torque. For example, a certain torque on bolt 204 may result in a given strain, which may be measured as elongation or contraction using magnetic field sensor 214, as described previously. Subsequently during the service life of bolt 204, magnetic field sensor 214 may be used to periodically or repeatedly query elongation measurement values for bolt 204. Ideally, an internal loading of bolt 204 will not change while in service, or will not deviate from a prescribed range of values. However, when a change in elongation (ergo loading) of bolt 204 does occur while in service, measurement values recorded from magnetic field sensor 214 may detect and quantify any such change, represented by a change in distance 220. In this manner, magnetic sensing device 200 may be used as an instrument for monitoring and/or certifying an operational condition of bolt 204. In certain embodiments, magnetic sensing device 200 may be used to determine when bolt 204 is indicated for replacement.

Figure 3:
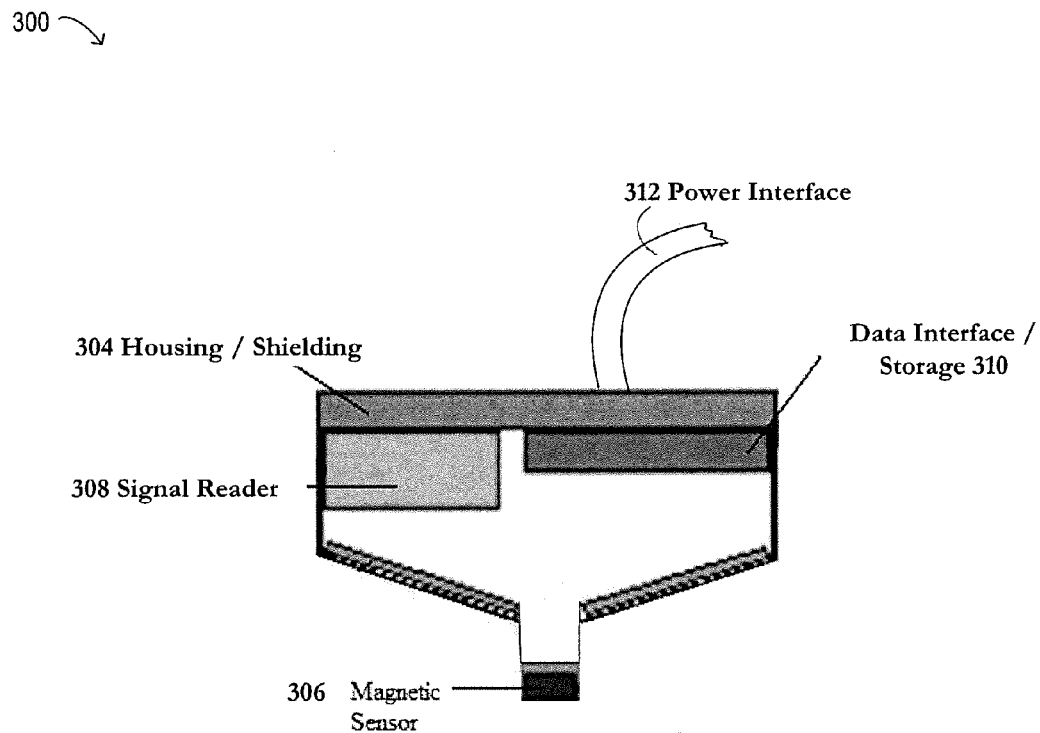
FIG. 3 is a block diagram of selected elements of an embodiment of a magnetic sensing device.

Turning now to FIG. 3, a block diagram of selected elements of an embodiment of bolt head 300 is illustrated. As shown in FIG. 3, bolt head 300 incorporates various elements of a magnetic sensing device, including magnetic sensor 306, but does not include a permanent magnet. Bolt head 300 may represent an embodiment of bolt head 206 of magnetic sensing device 200 (see FIG. 2). Bolt head 300 may be used with one or more permanent magnets embedded within a bolt (not shown in FIG. 3). Included within bolt head 300 may be signal reader 308, data interface/storage 310, and power interface 312, which are enclosed by housing/shielding 304. Signal reader 308 may represent an electronic device for controlling magnetic sensor 306 and obtaining measurement values from output signals provided by magnetic sensor 306 (see also FIG. 4). In certain embodiments, signal reader 308 includes a processor and memory media accessible to the processor and storing processor executable instructions. Signal reader 308 may be in communication with data interface/storage 310, which may include storage for buffering measurement values and a network interface for transmitting (i.e., uploading) the measurement values to an external network and/or device. Power interface 312 may represent an external power connection to bolt head 300 for powering the components included therein. In certain embodiments, power interface 312 may be an external power bus that is configured to supply (and/or monitor) power to a plurality of instances of bolt head 300. For example, power interface 312 may supply power to augment and/or replace a battery within bolt head 300 (see battery 216, FIG. 2). As described with respect to FIG. 2, data interface/storage 310 may be equipped with a wireless communication interface. It is noted that, in particular embodiments, data interface/storage 310 may be configured with an external physical connection (not shown) for communicating with external devices. In some embodiments, power interface 312 may be configured to provide both power and communication capability to bolt head 300.

Figure 4:
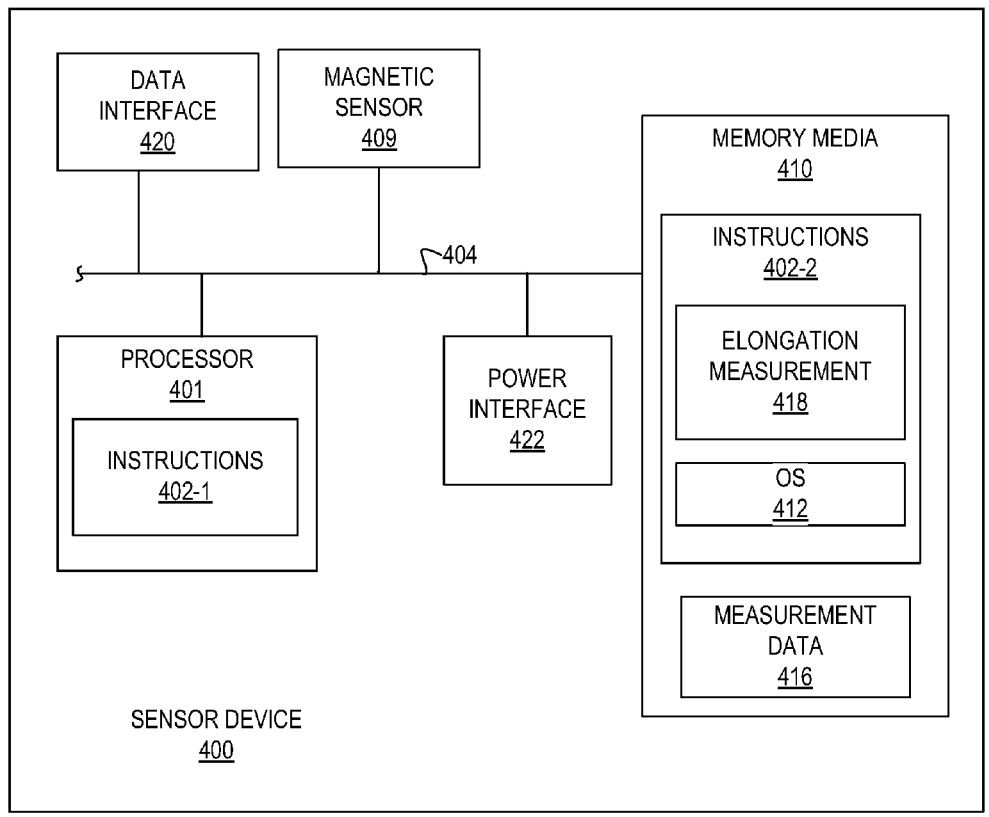
FIG. 4 is a block diagram of selected elements of an embodiment of a sensor device.

Referring now to FIG. 4, a block diagram illustrating selected elements of an embodiment of sensor device 400 is presented. Sensor device 400 may represent an implementation of magnetic sensing device 200 (see FIG. 2). As shown in FIG. 4, sensor device 400 may operate in conjunction with bolt 102 (see FIG. 1) and/or another type of fastener to execute the methods and operations described herein.

In the embodiment depicted in FIG. 4, sensor device 400 includes processor 401 coupled via shared bus 404 to storage media collectively identified as memory media 410. Sensor device 400, as depicted in FIG. 4, further includes data interface 420 that interfaces sensor device 400 to a network (not shown in FIG. 4), such as a wide-area network and/or a wireless network system. Also shown included with sensor device 400 are magnet sensor 409 and power interface 422. Magnetic sensor 409 may represent any of a variety of magnetic sensing devices and/or magnetic sensors, as described herein. Power interface 422 may represent a power source or connections to a power supply, as described above.

In FIG. 4, memory media 410 encompasses persistent and volatile media, fixed and removable media, and magnetic and semiconductor media. Memory media 410 is operable to store instructions, data, or both. Memory media 410 as shown includes sets or sequences of instructions 402-2, namely, an operating system 412, and elongation measurement 418, as well as measurement data 416. Operating system 412 may be a UNIX or UNIX-like operating system, a Windows® family operating system, or another suitable operating system. Instructions 402 may also reside, completely or at least partially, within processor 401 during execution thereof. It is further noted that processor 401 may be configured to receive instructions 402-1 from instructions 402-2 via shared bus 404. Elongation measurement 418 may perform methods and operations described herein for performing measurement using magnetic sensor 409, including method 500 (see FIG. 5), which may generate measurement data 416, and transmit measurement data 416 using data interface 420. It is noted that measurement data 416 may include data derived from the output signal of magnetic sensor 409, as well as calculated data, such as elongation data for a fastener.

Figure 5:
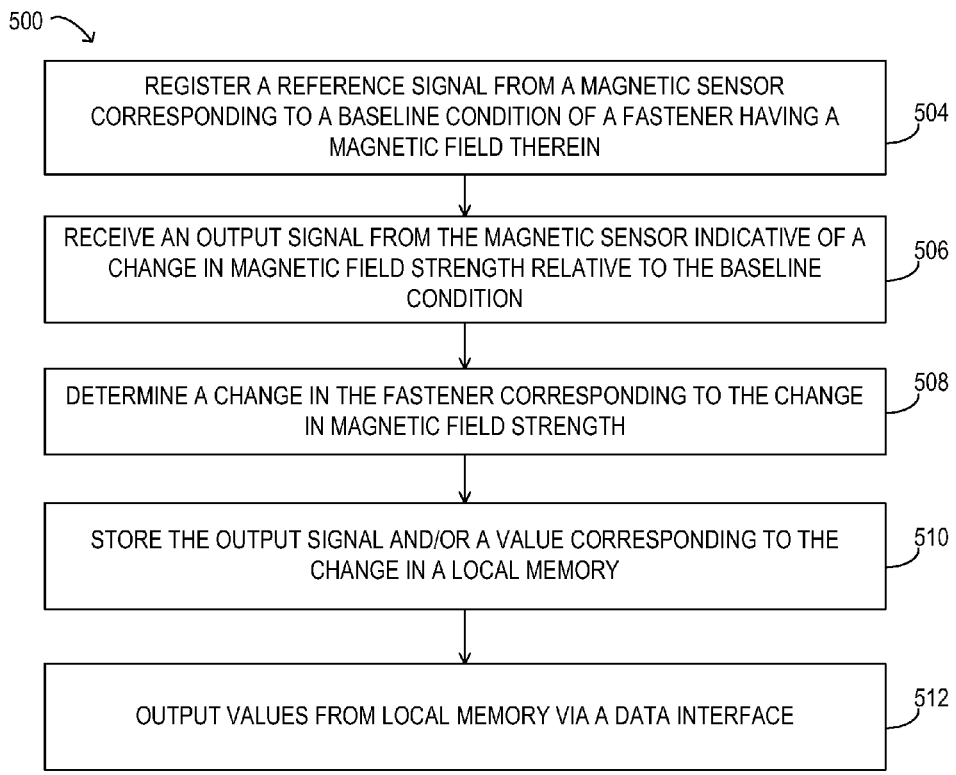
FIG. 5 illustrates an embodiment of a method for performing magnetic measurements.

Turning now to FIG. 5, an embodiment of method 500 for magnetic sensing is illustrated. In one embodiment, method 500 is performed by sensing device 400 (see FIG. 4). It is noted that certain operations described in method 500 may be optional or may be rearranged in different embodiments.

Method 500 may begin by registering (operation 504) a reference signal from a magnetic sensor corresponding to a baseline condition of a fastener having a magnetic field therein. The baseline condition may be an unloaded condition, a partially loaded condition, and/or a service loading condition. An output signal may be received (operation 506) from the magnetic sensor indicative of a change in magnetic field strength relative to the baseline condition. When the magnetic sensor is physically embedded in the fastener, the change in magnetic field may be attributed to a position of the magnetic sensor in the fastener. The change in magnetic field may be indicative of a change in elongation of the fastener, which may indicate a change in loading of the fastener. The change may be a positive or a negative change. In certain embodiments, the change is a transient signal. A change in the elongation of a fastener may be determined (operation 508) based on the change in magnetic field strength. Reference values and/or signals may be used to make a correlation to fastener condition in operation 508. An output signal and/or a value corresponding to the change may be stored (operation 510) in a local memory. The value corresponding to the change may be a calculated value. The local memory may be contained within the fastener in a sensing device. Values may be output (operation 512) from local memory via a data interface. The values (or data) may be output to an external network and/or device. In an alternative embodiment, rather than storing the output signal or value corresponding to the change in local memory, the output signal or value may be output directly to an external network or device.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A sensor, comprising:
    a first magnet installed at an end portion of a threaded fastener;
    a second magnet installed at a given distance to the first magnet along a radial axis of the threaded fastener;
    a magnetic sensor responsive to a magnetic field strength installed between the first magnet and the second magnet; and
    a signal reader configured to receive an output signal of the magnetic sensor and register changes in the magnetic field strength.

2. The sensor of claim 1, wherein the signal reader further comprises:
    a processor; and
    memory media accessible to the processor and storing processor executable instructions to implement at least a portion of the signal reader.

3. The sensor of claim 1, wherein the changes in the magnetic field strength represent elongation data for the threaded fastener based on a change in the given distance between the first magnet and the second magnet.

4. The sensor of claim 3, wherein the memory media are configured to store at least one of:
    measurement data derived from the output signal of the magnetic sensor; and
    the elongation data.

5. The sensor of claim 3, further comprising:
    an interface for transmitting the elongation data.

6. The sensor of claim 5, wherein the interface is a wireless interface.

7. The sensor of claim 5, wherein the interface is a radio frequency identification tag.

8. A fastener configured for monitoring elongation, comprising:
 a processor configured to access memory media; and
 a magnetic sensor,
 wherein the memory media include processor executable instructions to:
 receive output data generated by the magnetic sensor indicative of a magnetic field strength along a central axis of the fastener, wherein the magnetic field strength arises from at least one magnet installed on the fastener;
 calculate, based on a reference value for the magnetic field strength and the output data, an elongation of the fastener; and
 store data indicative of the elongation.

9. The fastener of claim 8, wherein the magnetic field strength arises from two magnets installed in the fastener, and wherein the magnetic sensor is located between the two magnets.

10. The fastener of claim 8, further comprising:
 a wireless interface,
 wherein the memory media include processor executable instructions to:
 transmit the data indicative of the axial elongation using the wireless interface.

11. The fastener of claim 8, wherein the wireless interface is a radio frequency identification tag configured to store the data indicative of the elongation.

12. The fastener of claim 8, wherein the processor instructions are executable to:
 store the reference value in response to a user input.

13. The fastener of claim 8, wherein the processor instructions are executable to:
 calibrate the magnetic field strength to the elongation.

14. The fastener of claim 8, wherein the fastener is configured to detect a change in the elongation of at least about 0.008 millimeters.

15. A method for monitoring elongation of a fastener, comprising:
 receiving an output signal from a magnetic sensor associated with the fastener, wherein the output signal is indicative of a magnetic field strength generated by a first magnet installed on the fastener at a first distance to the magnetic sensor;
 registering a reference signal from the magnetic sensor when the first distance is a known value; and
 registering an elongation value for the fastener based on the output signal and the reference signal when the first distance changes from the known value.

16. The method of claim 15, wherein the magnetic field strength is generated between the first magnet and a second magnet installed on the fastener at a second distance to the magnetic sensor.

17. The method of claim 15, further comprising:
 storing the elongation value.

18. The method of claim 15, further comprising:
 transmitting the elongation value to an external device.

19. The method of claim 18, wherein the transmitting is performed with a wireless interface.

20. The method of claim 19, wherein the wireless interface is a radio frequency identification tag.

* * * * *